US011180099B2

(12) United States Patent
Rebstock et al.

(10) Patent No.: US 11,180,099 B2
(45) Date of Patent: Nov. 23, 2021

(54) BUMPER FOR A MOTOR VEHICLE WITH REINFORCEMENT AND METHOD FOR MANUFACTURING THE BUMPER

(71) Applicant: CONSTELLIUM SINGEN GMBH, Singen (DE)

(72) Inventors: Thomas Rebstock, Hilzingen (DE); Andre Mueller, Hilzingen (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 438 days.

(21) Appl. No.: 16/305,974

(22) PCT Filed: May 17, 2017

(86) PCT No.: PCT/EP2017/061900
§ 371 (c)(1),
(2) Date: Nov. 30, 2018

(87) PCT Pub. No.: WO2017/211560
PCT Pub. Date: Dec. 14, 2017

(65) Prior Publication Data
US 2020/0339052 A1    Oct. 29, 2020

(30) Foreign Application Priority Data
Jun. 8, 2016   (EP) ..................................... 16173588

(51) Int. Cl.
*B60R 19/18*   (2006.01)
*B21D 28/26*   (2006.01)
*B60R 19/34*   (2006.01)

(52) U.S. Cl.
CPC .............. *B60R 19/18* (2013.01); *B21D 28/26* (2013.01); *B60R 19/34* (2013.01)

(58) Field of Classification Search
CPC ... B60R 19/18; B60R 19/34; B60R 2019/182; B21D 28/26
(Continued)

(56) References Cited

U.S. PATENT DOCUMENTS 5,404,974 A    4/1995   Thum et al.
6,481,690 B2*  11/2002  Kariatsumari .......... B60R 19/24
                                                    293/155
(Continued)

FOREIGN PATENT DOCUMENTS

DE    10 2008 029 634 A1    8/2009
DE    10 2011 004 197 A1    8/2012
(Continued)

OTHER PUBLICATIONS

Office Action, dated Jul. 7, 2020, corresponding to EP Application No. 17 724 347.4.
(Continued)

*Primary Examiner* — Pinel E Romain
(74) *Attorney, Agent, or Firm* — Ladas & Parry LLP; Malcolm J. MacDonald

(57) ABSTRACT

The invention relates to a bumper (10) for a motor vehicle, with a cross beam element (30) exhibiting a back side (22) designed to be fastened to the motor vehicle with at least one fastening device (25), preferably in the form of a crash box, and a front side (21) lying opposite the back side (22), wherein the cross beam element (30) has at least one hollow chamber (36, 37) with a closed cross section, and with a reinforcing element (40; 40a), which extends over part of the length of the cross beam element (30) and is joined with the cross beam element (30). The invention provides that the cross beam element (30) be designed together with the reinforcing element (40; 40a) as a single-piece extruded part.

16 Claims, 2 Drawing Sheets

Figure 1:
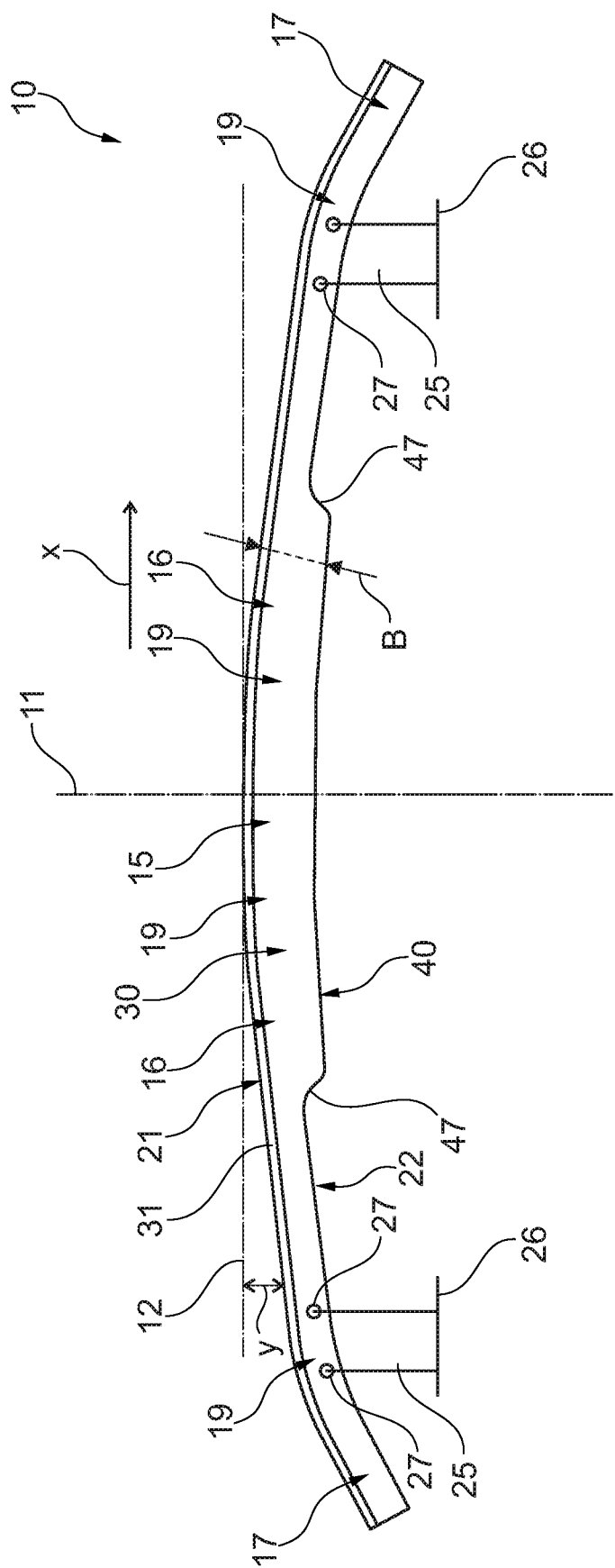

(58) Field of Classification Search
USPC .......................................................... 296/120
See application file for complete search history.

(56) References Cited

U.S. PATENT DOCUMENTS

| | | | | |
|---|---|---|---|---|
| 6,591,074 | B1* | 7/2003 | Michlin | G03G 15/0812 |
| | | | | 399/106 |
| 6,592,158 | B2* | 7/2003 | Kettler | B21D 5/08 |
| | | | | 188/371 |
| 7,258,395 | B2* | 8/2007 | Bataille | B62D 29/043 |
| | | | | 296/203.01 |
| 7,537,252 | B2* | 5/2009 | Nagai | B60R 19/18 |
| | | | | 293/102 |
| 7,726,709 | B2* | 6/2010 | Sampaio | B60R 19/18 |
| | | | | 293/122 |
| 9,751,478 | B2* | 9/2017 | Terada | B60R 19/18 |
| 2001/0024051 | A1 | 9/2001 | Kariatsumari et al. | |
| 2005/0104392 | A1 | 5/2005 | Liebhard et al. | |
| 2012/0126553 | A1 | 5/2012 | Mildner et al. | |
| 2016/0114747 | A1 | 4/2016 | Ishitobi et al. | |
| 2016/0159300 | A1* | 6/2016 | Matecki | B60R 19/18 |
| | | | | 293/120 |
| 2016/0280163 | A1* | 9/2016 | Matecki | E04C 3/06 |
| 2017/0144619 | A1* | 5/2017 | Shamoto | B60R 19/023 |
| 2018/0065578 | A1* | 3/2018 | Maier | B62D 25/2018 |
| 2018/0215332 | A1* | 8/2018 | Garnweidner | B60R 19/24 |
| 2018/0257586 | A1* | 9/2018 | Kitakata | B60J 5/0484 |

FOREIGN PATENT DOCUMENTS

| | | |
|---|---|---|
| DE | 10 2011 053 784 A1 | 3/2013 |
| DE | 10 2015 009 473 A1 | 1/2016 |
| EP | 2 923 894 A1 | 9/2015 |
| JP | 2003220909 A | 8/2003 |

OTHER PUBLICATIONS

International Search Report, dated Jul. 12, 2017, corresponding to International Application No. PCT/EP2017/061900.

Chinese Office Action, dated Jun. 10, 2021, corresponding to Chinese Application No. 2017800357523.

EP Office Action, dated May 10, 2021, corresponding to EP Application No. 17 724 347.4.

* cited by examiner

BUMPER FOR A MOTOR VEHICLE WITH REINFORCEMENT AND METHOD FOR MANUFACTURING THE BUMPER

PRIOR ART

The invention relates to a bumper for a motor vehicle. More particularly the invention relates to a bumper for a motor vehicle, with a cross beam element having at least one hollow chamber with a closed cross section, and with a reinforcing element, which extends over part of the length of the cross beam element and is joined with the cross beam element. The invention further relates to a method for manufacturing a bumper according to the invention.

A bumper for a motor vehicle with a cross beam element having at least one hollow chamber with a closed cross section, and with a reinforcing element, which extends over part of the length of the cross beam element and joined with the cross beam element is known from DE 10 2011 053 784. The known bumper is characterized by the fact that the latter exhibits a cross beam element consisting of at least two shaped sheet metal parts, for example which are joined together through welding. Viewed in the longitudinal direction of the cross beam element (wherein the longitudinal direction is understood as the direction in which the cross beam element has its greatest extension, and wherein the longitudinal direction runs transverse to the longitudinal direction of the vehicle in the installed state on the vehicle), the cross section of the cross beam element exhibits a hollow chamber. The height of the cross beam element changes in a longitudinal direction in such a way that the cross beam element exhibits a greatest height in a central section. By way of an intermediate section with a smaller height, the central section transitions on both sides into an outer section, which exhibits the smallest height. Situated one atop the other inside of the cross section of the cross beam element or inside of the hollow chamber are two separate reinforcing elements that each exhibit a hollow space and take the form of tubes having a rectangular cross section, wherein their length differs as viewed in the longitudinal direction of the cross beam element. A bumper with this construction having a reinforcing element can be adjusted to legal requirements or crash tests so as to exhibit an optimized deformation behavior given a relatively low weight. The disadvantage here is that this construction made up of several components results in relatively high manufacturing costs for the known bumper.

Known from JP 4057815 B2 is another bumper with a cross beam element having at least one hollow chamber with a closed cross section, and with a reinforcing element, which extends over part of the length of the cross beam element and is joined with the cross beam element. This bumper is characterized by the fact that several reinforcing elements are situated on the side of the cross beam element facing away from a vehicle front, and each extend over a partial area of the cross member element in its longitudinal direction. The reinforcing elements are each designed as shaped sheet metal parts, which together with the side of the cross member element facing the reinforcing element form a hollow chamber in the installed state. The reinforcing elements are fastened to the outside of the cross beam element, for example in an overlapping area by means of welding or the like. This type of bumper is also associated with a relatively high production outlay due to the separate reinforcing elements that must be joined with the cross beam element or fastened to the cross beam element.

Further known from DE 10 2015 009 473 A1 is to manufacture a cross beam element of a bumper in particular out of a lightweight material such as aluminum in an extrusion process and provide it with a separate reinforcing element situated in the cross section of the hollow profile of the cross beam element. Such a bumper is characterized by the fact that the cross section of the cross beam element is at least essentially constant as viewed in the longitudinal direction as the result of the extrusion process.

DISCLOSURE OF THE INVENTION

Proceeding from the described prior art, the object of the invention is to further develop a bumper for a motor vehicle with a cross beam element exhibiting a back side designed to be fastened to the motor vehicle with at least one fastening device, preferably in the form of a crash box, and a front side lying opposite the back side, wherein the cross beam element has at least one hollow chamber with a closed cross section, and with a reinforcing element, which extends over part of the length of the cross beam element and is joined with the cross beam element, in such a way as to make manufacturing the bumper simple and inexpensive given the lowest possible weight and best possible crash behavior.

This object is achieved in a bumper for a motor vehicle wherein the cross beam element is designed together with the reinforcing element as a single-piece extruded part.

The invention is based on the idea of making the cross beam element of the bumper together with the reinforcing element in a single manufacturing step in an extrusion process, and then partially removing the reinforcing element from the cross beam element, so that the reinforcing element is only joined (as a single piece) with the cross beam member in those areas where stricter strength requirements are placed on the bumper, in particular to ensure compliance with crash requirements. Understood by a single-piece configuration of the cross beam element and the reinforcing element is a monolithic configuration in which both elements are simultaneously generated in one manufacturing step.

The advantage to such a bumper in particular is that, as opposed to prior art, the reinforcing element does not have to be fastened to the cross beam element in an additional manufacturing step. Rather, it is sufficient that the reinforcing element running over the entire length of the cross beam element and fabricated together with the cross beam element first be removed from areas of the cross beam element. For example, the material removed in the process can be recycled, and hence returned to the production process. In addition, the advantage to the bumper according to the invention is that the single-piece configuration of the cross beam element together with the reinforcing element makes it possible to optimize the strength of the bumper with a given weight or to reduce the weight with a given resistance, provided that a homogeneous material joint without welded seams or the like is present in the area where the reinforcing element is joined to the cross beam element.

Beyond that, the special advantage to the single-piece configuration of the cross beam element together with the reinforcing element is that any geometries can in principle be realized for the reinforcing element, and the reinforcing element can be joined to the cross beam element at locations that are not realizable with conventional methods, e.g., by way of a welded joint. For example, when providing a welded joint, it must be possible to form the welded seam from outside, and an overlapping area must typically be provided between the cross beam element and reinforcing element. This is not necessary in the bumper according to the invention, since the reinforcing element and cross beam element can be joined together at nearly any point of the cross section of the bumper.

Advantageous further developments of the bumper according to the invention for a motor vehicle are enumerated in the subclaims. Any combinations of at least two of the features disclosed in the specification, claims and/or figures fall within the framework of the invention.

In a preferred embodiment, the reinforcing element is made of at least one closed cross section. In order to form a closed cross section on the reinforcing element while simultaneously minimizing the material required and weight, it is provided that the reinforcing element together with at least one wall of the cross beam element form at least one additional hollow chamber (apart from the at least one hollow chamber in the cross beam element).

In order to reduce the size of the bumper as viewed in the vehicle direction or in a direction running perpendicular to the longitudinal direction of the cross beam element while maintaining good crash or strength properties, it is provided that the reinforcing element run at least essentially over the entire height of the cross beam element in which the at least one hollow chamber is formed on the cross beam element.

In order to enable an even surface without protrusions with the bumper mounted to the vehicle front, it is provided in particular that the reinforcing element be situated on the back side of the cross beam element.

However, it can also be provided that the reinforcing element be situated on the front side of the cross beam element facing away from the vehicle. As a rule, this is always possible and sensible when the cross beam element or bumper is still provided with an additional trim or other elements, which increase the size of the bumper on the front side of the bumper facing away from the vehicle, so that enough installation space is available for the reinforcing element.

In a preferred structural configuration of the reinforcing element, the latter exhibits an end wall situated parallel to the back side of the cross beam element with two connecting bridges preferably situated parallel to each other and running perpendicular to the back side of the cross beam element. Therefore, the reinforcing element has a U-shaped cross section, and its open side is joined with the back side of the cross beam element.

In order to optimize the strength properties of the bumper or reinforcing element while keeping the material required and thus the weight as low as possible, a further development of the latter structural proposal provides that the end wall and connecting bridges exhibit a differing wall thickness. In particular, it can be provided that the end wall exhibits a larger wall thickness than the two connecting bridges. However, depending on the specific requirements, it is also conceivable that the end wall exhibit a smaller wall thickness than the connecting bridges.

The crash properties of the bumper are further optimized by having the connecting bridges of the reinforcing element be at least roughly aligned with at least one transverse wall, which forms the at least one hollow chamber on the cross beam element.

Another optimization involving the strength properties and weight minimization provides that the end wall of the reinforcing element exhibit sections over its height with differing wall thicknesses.

In order to minimize notch effects and thus optimize the crash properties of the bumper, it is further advantageous for the reinforcing element to be rounded or slanted in design in the transitional area to the cross beam element. This precludes any sharp corners or edges that would diminish the strength.

The bumper described to this point can in particular also be bent along its longitudinal direction for purposes of adjustment to the body shape. In addition, the bent shape also improves the strength properties or crash behavior.

In a construction optimized in terms of the crash behavior of the bumper, in which the latter simultaneously exhibits a relatively shallow depth or requires relatively little installation space as viewed in the longitudinal direction of the vehicle, it is provided that the reinforcing element be situated in a central area of the cross beam element as viewed in the longitudinal direction, and that two crash boxes be provided, situated on each side of the reinforcing element and joined with the cross beam element. In particular in conjunction with an arrangement of the reinforcing element on the back side of the cross beam element, this does not increase the required installation space for the bumper by comparison to a bumper without a reinforcing element. However, the reinforcing element can also be situated in the two outer areas of the cross beam element in relation to the longitudinal extension of the cross beam element. This makes sense in particular when additional installation space is required in the central area, for example a number plate or the like.

For reasons both of weight and easiest possible manufacture, it is further provided in particular that the bumper comprises aluminum alloy, preferably from the 6XXX series alloy. The alloys are designated according to the regulations of The Aluminum Association, known to a person skilled in the art.

The invention also encompasses a method for manufacturing a bumper according to the invention as described thus far. The method is characterized by at least the following production steps: In a first step, an endless, single-piece profile cross section is initially fabricated in an extrusion process, wherein the profile cross section exhibits a cross beam element section with at least one hollow chamber and a reinforcing element section. A section is then separated from the endless profile section, wherein the length of the severed section is adjusted to the length of the bumper. Finally, at least one partial area of the length of the reinforcing element section is removed from the profile cross section. The total length of the removed area of the reinforcing element is preferably between 20% and 80% of the length of the bumper.

There are basically different options available for removing the unrequired partial areas of the reinforcing element section from the profile section. The use of punches is preferred, since this can enable rational production at relatively low costs, in particular given large quantities. However, it is also conceivable, for example, to use a laser beam device or milling or other separating methods, in particular in cases where the partial area of the reinforcing element section is only removed after the molding process given a bent bumper.

In the event that the partial area of the reinforcing element section is removed from the profile section via punching, it makes sense, in particular so as to make removing the reinforcing element section easy to do, that the bumper only be deformed after removing the partial area of the reinforcing element section.

Additional advantages, features and details of the invention may be gleaned from the following description of preferred exemplary embodiments as well as based upon the drawing.

Figure 2:
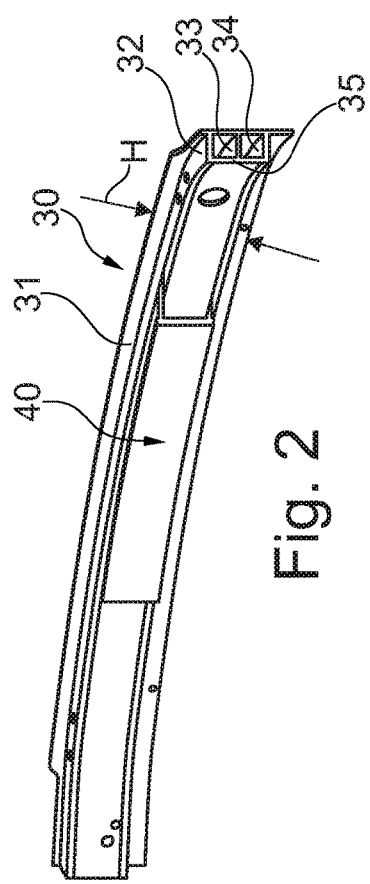

The latter show:

FIG. 1 a top view of a bumper according to the invention for a motor vehicle;

FIG. 2 a perspective partial view of a bumper modified in comparison to FIG. 1;

FIG. 3 and

Figure 4:
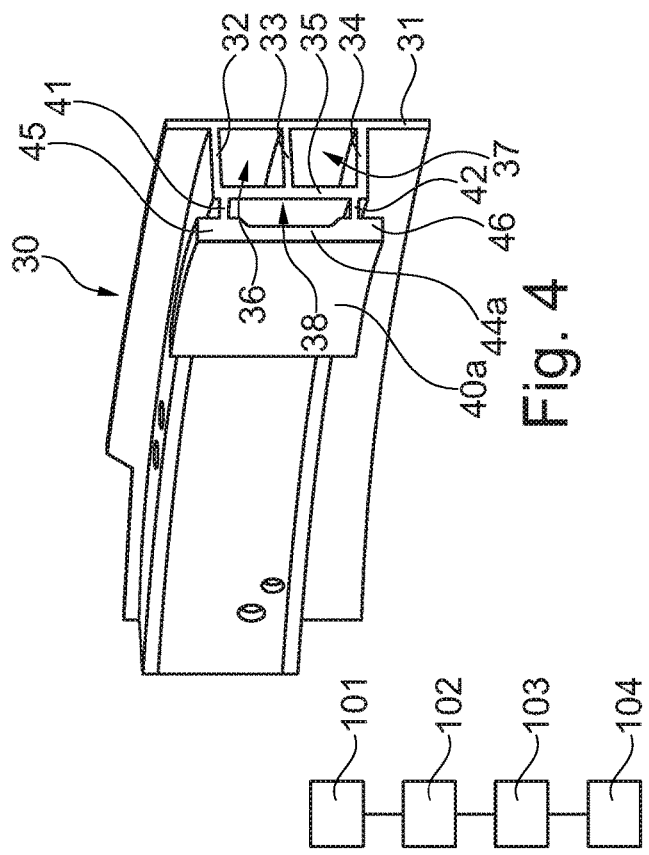
Figure 5:
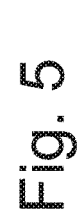

FIG. 4 respective cross sections of bumpers in a perspective view with reinforcing elements of varying design, and FIG. 5 a diagram for explaining the manufacturing process for a bumper according to the invention.

The same elements or elements with the same function are marked with the same reference numbers on the figures.

The bumper 10 for a vehicle shown in a top view on FIG. 1 is situated on the vehicle front of the motor vehicle (not depicted), for example. However, use of the bumper 10 is not to be confined to a vehicle front; rather, it should also be the case that the bumper 10 can be situated on the rear side of the vehicle or tail end of the vehicle.

As evident from FIG. 1, the bumper 10 is mirror-inverted relative to a plane 11, for example. An X-axis runs perpendicular to the plane 11, denoting the longitudinal direction of the bumper 10. Proceeding from the plane 11, the bumper 10 has a curved design as viewed in both directions of the X-axis, i.e., a distance y formed between a transverse axis 12 situated perpendicular to the axis 11 and the bumper 10 enlarges in the direction of the X-axis, starting from the axis 11. In the exemplary embodiment shown, the curvature of the bumper 10 is not uniform in design. Rather, the bumper 10 exhibits respective sections 15 to 17 that are roughly straight or even, and connected with each other by curved sections 19 arranged between the sections 15 to 17. Of course, bending the bumpers 10 uniformly or non-uniformly in the direction of the X-axis also lies within the framework of the invention.

The bumper 10 comprises aluminum alloy, preferably from the 6XXX series alloy and designed as an extruded part exhibits a front side 21 and a back side 22. The back side 22 is designed to be joined with two areas spaced relatively wide apart from the axis 11 symmetrically to the longitudinal axis 11, each having a crash box 25. Once again purely as an example, the crash box 25 exhibits a respective fastening plate 26, which is joined with a side member of the motor vehicle (not depicted). In order to fasten the crash boxes 25 to the bumper 10, the latter exhibits fastening openings 27, for example, by means of which the crash box 25 can be screwed to the bumper 10, for example.

In the depiction on FIG. 1, the bumper 10 exhibits a different width B as viewed in the direction of the X-axis. The width B in the area of section 15 is greater than in the area of sections 17.

The bumper 10 comprises a cross beam element 30, which exhibits a front end wall 31 on its front side 21, as visible in particular from FIGS. 1 and 2. The height H of the front end wall 31 can vary in size as viewed in the direction of the X-axis. In particular, it is provided that the height H of the front end wall 31 be greatest in the central area of the bumper 10, and least in the direction of the lateral borders of the bumper 10, i.e., in the area of sections 17. The varying heights H of the front end wall 31 are realized after extruding the bumper 10, in particular in a machining step. As further especially evident from FIG. 2, three parallel transverse walls 32 to 34 spaced apart from each other proceed from the front end wall 31 in the direction of the back side 22 of the cross beam element 30, and are once again joined as a single piece with a rear end wall 35 situated parallel to the front end wall 31. Preferably, the wall thickness d of the transverse walls 32 to 34 is thinner than the wall thickness D of the front end wall 31 and the rear end wall 35. However, the wall thicknesses d, D can also be equal in size. In addition, the front end wall 31 extends beyond the respective upper transverse wall 32 or lower transverse wall 34. The two end walls 31 and 35 and transverse walls 32 to 34 form two closed hollow chambers 36, 37, e.g., designed with a square cross section.

Figure 3:
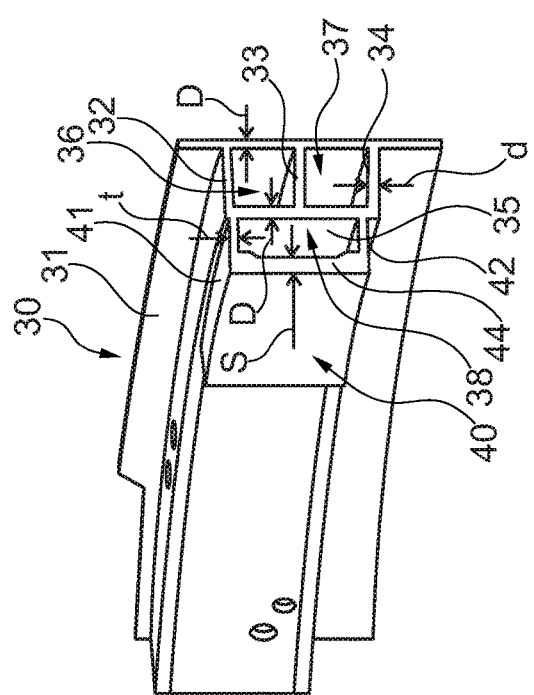

The rear end wall 35 of the cross beam element 30 is joined as a single piece with a reinforcing element 40. A reinforcing element 40 in the sense of this application is an element which serves to strengthen the cross beam element 30 in order to obtain better results for example in crash tests or which enables the cross beam element 30 to fulfill legal test crash proceedings in a better manner. Furthermore, the reinforcing element 40 is an integrated part of the cross beam element 30 in a sense that the reinforcing element 40 is produced monolithically with the cross beam element 30 during extrusion process. The reinforcing element 40 is situated on the back side 22 of the bumper 10, and in the exemplary embodiment according to FIG. 1 runs symmetrically to the longitudinal axis 11 in the area of the sections 15 and 16. The reinforcing element 40 depicted on FIGS. 2 and 3 exhibits an upper connecting bridge 41 and a lower connecting bridge 42, which are situated parallel to each other and parallel to the transverse walls 32 to 34. The two reinforcing bridges 41, 42 run roughly aligned with the two transverse walls 32 to 34, somewhat offset in the direction of the central transverse wall 33 in the exemplary embodiment on FIGS. 2 and 3. The two connecting bridges 41, 42 are joined as a single piece with an end wall 44 on the side facing away from the rear end wall 35, thereby forming an additional hollow chamber 38 between the end wall 35 and reinforcing element 40. In the exemplary embodiment shown, the wall thickness t of the two connecting bridges 41, 42 is thinner than the wall thickness S of the end wall 44. As further evident from FIG. 3, the wall thickness S is not uniformly large as viewed over the height of the end wall 44, but rather is larger in the area of the two connecting bridges 41 and 42 than in a central section of the end wall 44.

The reinforcing element 40a shown on FIG. 4 exhibits an end wall 44a that is elongated in design beyond the two connecting bridges 41, 42, thereby forming a respective reinforcing edge 45, 46 that runs in the direction of the X-axis.

As evident in particular based on FIG. 1, the transitional area between the reinforcing element 40 and cross beam element 30 is designed or provided with a respective rounding 47.

The cross beam element 30 is fabricated together with the reinforcing element 40, 40a as a single piece in an extrusion process. Reference will now be made to FIG. 5 to explain the production method or production steps. As depicted therein, manufacturing the bumper 10 encompasses a first step 101, in which an endless profile cross section is fabricated. An endless profile section is here understood as a profile cross section whose length as viewed in the direction of the X-axis is greater than the length of the bumper 10. The profile section fabricated at a (conventional) extrusion plant here exhibits both the cross section of the cross beam element 30 in the form of a cross beam element section, as well as that of the reinforcing element 40, 40a in the form of a reinforcing element section. Put another way, this means that the profile cross section fabricated in the first step 101 also exhibits the reinforcing section 40, 40a as viewed over its entire length. In a second step 102, a section of length to be used in making an individual bumper 10 is then severed from the endless profile section.

In a subsequent third step 103, the part of the reinforcing element 40, 40a present in the partial area where no reinforcing element 40, 40a is provided on the finished bumper 10 is removed. While this is preferably accomplished via punching, other separating methods can also be provided, in particular machining methods, such as milling or sawing, or severance by means of a laser beam device.

Finally, the bumper 10 is formed into its curved or bent shape as depicted on FIG. 1 in a fourth step 104, for example. The two crash boxes 25 can subsequently be mounted on the bumper 10 fabricated in this way.

The bumper 10 described to this point can be changed or modified in a variety of ways without deviating from the inventive idea. For example, it is also conceivable to additionally or alternatively situate or design the reinforcing element 40, 40a in the area of the upper side or lower side of the bumper 10.

The invention claimed is:

1. A bumper for a motor vehicle, comprising:
   a cross beam element having a hollow chamber with a closed cross section, a rear side, and a front side opposing the rear side; and
   a reinforcing element extending over a portion of a length of the cross beam element, and formed integrally with the cross beam element from a single-piece extruded part.

2. The bumper according to claim 1, wherein the reinforcing element and an end wall of the cross beam element form an additional hollow chamber.

3. The bumper according to claim 1, wherein the reinforcing element runs essentially over an entire height of the cross beam element in which the hollow chamber is located on the cross beam element.

4. The bumper according to claim 1, wherein the reinforcing element is situated on the rear side of the cross beam element.

5. The bumper according to claim 1, wherein the reinforcing element is situated on the front side of the cross beam element.

6. The bumper according to claim 2, wherein the reinforcing element comprises an end wall situated parallel to an end wall of the cross beam element, and at least two connecting bridges are situated parallel to each other, and perpendicular to the end wall of the cross beam element.

7. The bumper according to claim 6, wherein a thickness of the end wall is different from a thickness of a wall of the at least two connecting bridges.

8. The bumper according to claim 6, wherein the at least two connecting bridges are approximately aligned with a transverse wall of the hollow chamber.

9. The bumper according to claim 6, wherein the end wall of the reinforcing element comprises sections with differing wall thicknesses.

10. The bumper according to claim 1, wherein the cross beam has a curved geometry.

11. The bumper according to claim 1, further comprising first and second fastening devices joined to opposing sides of the cross beam element, and on either side of the reinforcing element, which is longitudinally centrally located on the cross beam element.

12. The bumper according to claim 1, wherein the reinforcing element is situated in two outer areas of the cross beam element relative to a longitudinal extension of the cross beam element.

13. A method for manufacturing a bumper, comprising:
   extruding an endless, single-piece, profile cross section in a form of a cross beam element section with a hollow chamber and a reinforcing element section;
   severing a section from the endless profile cross section corresponding to a length of the bumper; and
   removing a partial area of the reinforcing element section from the cross beam element section.

14. The method according to claim 13, comprising partially removing the partial area of the reinforcing element section by punching.

15. The method according to claim 13, further comprising deforming the bumper after removing the partial area of the reinforcing element section.

16. The bumper according to claim 11, wherein the at least two fastening devices are in a form of a crash box.

* * * * *